(12) United States Patent
Acar et al.

(10) Patent No.: US 11,038,986 B1
(45) Date of Patent: Jun. 15, 2021

(54) SOFTWARE-SPECIFIC AUTO SCALING

(71) Applicant: Amazon Technologies, Inc., Seattle, WA (US)

(72) Inventors: Bradley Acar, Johannesburg (ZA); Sean Michael Needham, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 414 days.

(21) Appl. No.: 15/280,562

(22) Filed: Sep. 29, 2016

(51) Int. Cl.
    *H04L 12/24* (2006.01)
    *H04L 29/08* (2006.01)
    *H04L 29/06* (2006.01)

(52) U.S. Cl.
    CPC .............. *H04L 67/34* (2013.01); *H04L 67/10* (2013.01); *H04L 67/42* (2013.01)

(58) Field of Classification Search
CPC ........... G06F 17/30345; G06F 9/44505; G06F 11/3048; G06F 11/3093; G06F 2201/865; G06F 21/566; G06F 2212/151; G06F 9/45558; G06F 2009/45595; G06F 2009/4557; G06F 9/45533; G06F 11/30; G06F 11/3433; G06F 9/542; G06F 11/366; G06F 2209/508; G06F 8/60; G06F 8/71; H04L 43/0876; H04L 67/34; H04L 41/0266; H04L 41/5054; H04L 43/08; H04L 41/0806; H04L 41/12; H04L 41/0803; H04L 63/10; H04L 47/78; H04L 67/322; H04L 63/08; H04L 67/10; H04L 41/22; H04L 47/70; H04L 67/141; H04L 47/76; H04L 47/828; H04L 67/32; H04L 45/02; H04L 67/20

USPC ....... 709/203, 220, 223, 224, 229, 217, 219, 709/202, 201, 226; 718/1, 104
See application file for complete search history.

(56) References Cited

U.S. PATENT DOCUMENTS

| | | | |
|---|---|---|---|
| 9,146,721 B1 * | 9/2015 | Nagaraja | G06F 8/60 |
| 2003/0074430 A1 * | 4/2003 | Gieseke | H04L 41/0213 |
| | | | 709/221 |
| 2005/0021696 A1 * | 1/2005 | Hunt | G06F 9/5066 |
| | | | 709/220 |
| 2008/0016198 A1 * | 1/2008 | Johnston-Watt | H04L 67/104 |
| | | | 709/223 |

(Continued)

*Primary Examiner* — Tonia L Dollinger
*Assistant Examiner* — Linh T. Nguyen
(74) *Attorney, Agent, or Firm* — Patterson + Sheridan, LLP

(57) ABSTRACT

Techniques are disclosed for modifying an application-level configuration of a cluster of virtual application servers in response to an automatic provisioning of server instances to or from the cluster. An auto-scaling service receives an indication that one or more metrics associated with a cluster in a service provider environment triggers a specified scaling condition. The cluster includes application server instances executing one or more services provided by an application. The auto-scaling service provisions an additional application server instance in response to the indication. One or more services provided by the application are installed on the additional application server instance. A configuration engine obtains one or more scripts for configuring the additional application server instance to execute the services as part of the cluster. The scripts are executed on the application server instances to include the additional application server instance to the cluster.

19 Claims, 8 Drawing Sheets

(56) References Cited

U.S. PATENT DOCUMENTS

| | | | |
|---|---|---|---|
| 2010/0316012 A1* | 12/2010 | Stanwood | H04W 28/24 370/329 |
| 2013/0232463 A1* | 9/2013 | Nagaraja | G06F 8/61 717/101 |
| 2013/0275969 A1* | 10/2013 | Dimitrov | G06F 8/61 718/1 |
| 2014/0123129 A1* | 5/2014 | Risbood | G06F 9/4433 717/176 |
| 2015/0089064 A1* | 3/2015 | Salle | H04L 47/125 709/226 |
| 2015/0242197 A1* | 8/2015 | Alfonso | G06F 8/65 717/173 |
| 2015/0350101 A1* | 12/2015 | Sinha et al. | H04L 12/911 709/206 |
| 2016/0254943 A1* | 9/2016 | Maes | H04L 12/24 709/224 |
| 2016/0306670 A1* | 10/2016 | Arndt | G06F 11/34 |
| 2016/0323377 A1* | 11/2016 | Einkauf | H04L 67/1076 |
| 2017/0033988 A1* | 2/2017 | Zhuo | H04L 61/2015 |
| 2017/0142157 A1* | 5/2017 | Cao | H04L 63/20 |
| 2017/0237618 A1* | 8/2017 | Jones | H04L 41/0823 709/221 |
| 2017/0237647 A1* | 8/2017 | N. et al. | H04L 12/26 709/224 |
| 2017/0250863 A1* | 8/2017 | Mukherjee | H04L 41/0813 |
| 2017/0286148 A1* | 10/2017 | Zou | G06F 9/455 |
| 2018/0046482 A1* | 2/2018 | Karve | G06F 9/45558 |
| 2018/0225139 A1* | 8/2018 | Hahn | G06F 9/455 |

\* cited by examiner

SOFTWARE-SPECIFIC AUTO SCALING

BACKGROUND

Embodiments presented herein generally relate to resource management in a cloud computing environment. More specifically, embodiments presented herein provide techniques for configuring an application stack executing in the cloud computing environment in response to changes in resource demand.

Cloud computing platforms provide users and enterprise customers with a variety of compute services. For example, an Infrastructure-as-a-Service (IaaS) platform may provision virtual server instances and deploy applications on those instances. Further, users can create, deploy, and terminate instances as needed, e.g., in response to ongoing demand by individuals accessing the application. Further still, a cloud computing platform may provide auto-scaling services—automating the creation of additional instances (and similarly, termination of those instances) by monitoring resource utilization metrics of the virtual servers of the user and provisioning instances if the metrics trigger specified conditions. For example, the cloud computing platform may detect that CPU utilization of a virtual server cluster exceeds a threshold specified by the user. In response, the cloud computing platform may provision additional instances to the virtual server cluster according to a policy set by the user. As a result, the virtual server cluster can efficiently adapt to changes in network traffic and resource load with minimal effort on the part of the user.

Many applications executed on cloud-based computing platforms generally support auto-scaling. For instance, a user can develop applications specifically designed to be executed in the cloud. These applications can scale up or down alongside the creation or termination of virtual server instances on the cloud computing platform. That is, when the cloud computing platform provisions a new server instance, the server is automatically configured to run with the rest of the cluster. Because deployment of applications otherwise relies on realistic estimations to maximize efficiency at cost, auto-scaling provides added flexibility for deviations from the estimations.

However, certain applications, such as some closed-source enterprise applications, can be scaled to execute on multiple servers, but still need certain configuration applied, for example to configure software on the newly created instance or to configure existing instances to account for the newly created instance. For example, assume that a user has configured application server instances to execute an enterprise Voice over IP (VoIP) application developed by a third-party. Further, assume that due to increased resource demand, auto-scaling services running in the network provision an additional application server instance (e.g., by spawning from a machine image used to create the currently running instances). In such a case, if the application needs additional configurations, the application would not be configured to account for the new instance. As a result, VoIP requests forwarded to that instance by a load balancer may go unprocessed unless the user first updates the application configuration on the cloud, which can be a time consuming and error prone process.

BRIEF DESCRIPTION OF DRAWINGS

Various embodiments in accordance with the present disclosure will be described with reference to the drawings, in which.

DETAILED DESCRIPTION

Figure 1:
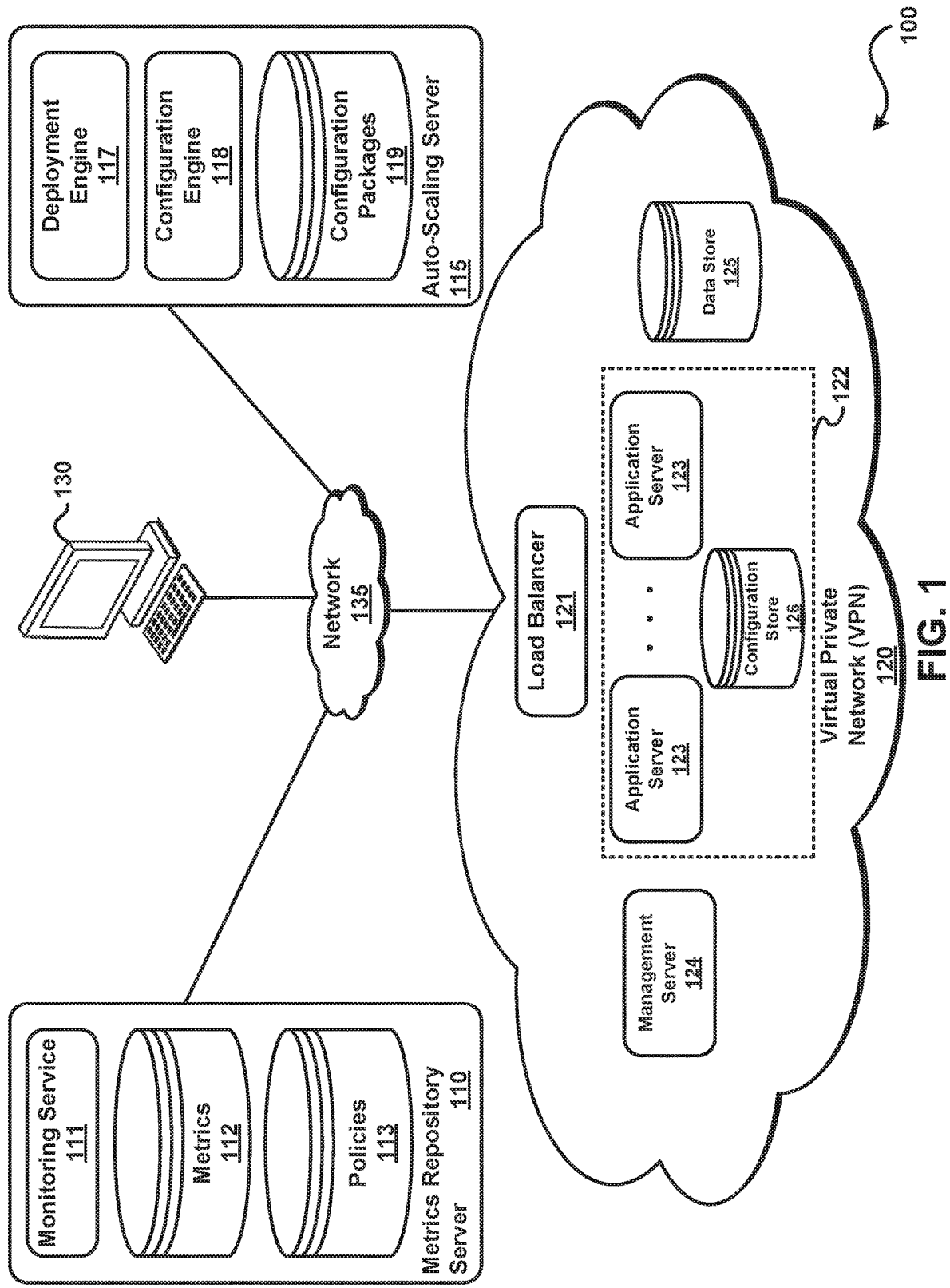
FIG. 1 illustrates an example of a cloud computing environment hosting a service used to provision additional computing instances based on software-specific metrics, according to one embodiment.

Generally, auto-scaling services provision server instances to an application server cluster in response to conditions, e.g., CPU utilization across servers in the cluster exceeds some threshold. Once triggered, the auto-scaling service may deploy a given amount of servers (e.g., specified in a user subscription), load a virtual machine image in each server, and register the deployed servers with a load balancer. The machine image contains a bootstrap program that, when executed, performs basic configuration of the application on the server, such as registering network addresses associated with the server on the application.

Current auto-scaling solutions rely on the underlying application to be designed to handle changes to the application infrastructure dynamically. For example, a typical application designed for the cloud can route instructions across instances based on changes in the cluster. However, for some applications, such as enterprise applications, the newly-provisioned instance might not have information regarding other servers in the cluster, what role the server has relative to the cluster, or any of its roles within the cluster. To ensure that a newly-provisioned instance properly functions, a user must manually configure the new instance as well as the cluster, e.g., registering the additional instances with a directory service, updating dynamic routing tables, adding network addresses to a configuration file, and the like.

To address such issues, embodiments presented herein disclose techniques for auto-scaling server instances in a cloud computing network. In particular, embodiments presented herein provide an automatic configuration for an application stack executing on servers of an auto-scaling group, such as a cluster of virtual servers. The application stack may correspond to third-party enterprise software that normally does not dynamically scale. In one embodiment, an auto-scaling service maintains a configuration package associated with the application stack. The configuration package includes scripts and configuration data specific to the application stack. The scripts include commands, which, when executed (e.g., by a function invoked by an event-driven computing service), configures the new server instance with the cluster.

In one embodiment, the auto-scaling service determines that an additional application server needs to be provisioned to the cluster. For instance, a metrics repository server that collect metrics for the cluster may indicate to the auto-scaling service that a specified condition has been triggered for adding a new instance to the cluster. Metrics can relate to resource utilization of the cluster, such as CPU utilization, disk reads, disk writes, etc. As further described below, the metrics repository server may also collect metrics specific to the application. As an example, assume that the application corresponds to enterprise Voice over IP (VoIP) software used by an organization. In such a case, application-specific metrics may include a number of concurrent VoIP calls per server, number of licenses, number of active users, etc.

Once determined, the auto-scaling service may provision the instance and add the instance to the cluster. As further described below, the auto-scaling service provides a configuration engine that injects the configuration package into the application stack. The configuration engine may then execute the scripts in the package (e.g., via a function invoked by the event-driven computing service) to add the newly-created instance to the configuration within the application stack. Continuing the previous example of a VoIP application executing in a cluster, the configuration package may include scripts for accessing a central management server associated with the VoIP application. When executed, a script may register the new instance on the central management server to cause the central management server to broadcast the availability of the new instance to other application servers in the cluster.

Advantageously, this approach allows an auto-scaling solution to manage applications, such as closed-source or enterprise applications, that do not scale server instances without manual configuration. When an auto-scaling service adds new application server instances to a cluster, the configuration engine can, for example, using an event-driven computing service, automatically inject and execute scripts of a configuration package associated with the application to directly configure the new instances and the cluster. Further, this approach also does not require redesign of the application itself. For instance, the configuration package provided contains scripts that work externally relative to the application stack. In addition, software-specific metrics can be transmitted to a metrics repository server via an agent application executing on the server instance, rather than from the application directly.

Note, the following uses an enterprise VoIP application as a reference example of a closed-source application that can be automatically configured as part of a new application server instance of an auto-scaling group. However, one of ordinary skill in the art will recognize that the embodiments presented herein may be adapted to a variety of applications. For example, the configuration service may automatically update a virtual server cluster executing an enterprise resource planning (ERP) application. In such a case, a metrics repository service may observe application-specific metrics (e.g., a number of forms open concurrently, number of activated licenses, number of business units per instance, and the like) used to trigger an auto-scaling service to create additional instances of an application server. Once provisioned, the scripts provided in the configuration package may include an automation script that, when executed by an event-driven computing service, modifies a configuration markup language file to include metadata associated with additional server instances. As another example, the configuration service may be adapted to a virtual server cluster executing an enterprise e-mail server application stack. Application-specific metrics for the e-mail server application can include a number of concurrent backup jobs, a number of incoming mail server connections, and the like. Scripts used to configure the e-mail servers may include commands for accessing a configuration server that maintains a topology of the cluster and directing the configuration server to add metadata associated with additional server instances when the instances are provisioned to the cluster.

FIG. 1 illustrates an example of a cloud computing environment 100 hosting a service used to provision additional computing instances based on software-specific metrics, according to one embodiment. As shown, the computing environment 100 includes a metrics repository server 110, an auto-scaling server 115, a virtual private network (VPN) 120, and a management console 130, each interconnected via a network 135 (e.g., the Internet). The cloud computing environment 100 generally represents an Infrastructure-as-a-Service (IaaS) provider setting that offers IaaS services to a user (e.g., an enterprise, individual, small organization, etc.). Although FIG. 1 depicts the metrics repository server 110, auto-scaling server 115, and VPN 120 as separate components connected via the network 135, the metrics repository server 110, auto-scaling server 115, and VPN 120 may be part of the IaaS provider. The management console 130 may be a computer that connects to the network 135 to access the services of the IaaS provider. The management console 130 may also be a virtualized service that is accessed by remote devices as part of the IaaS provider.

In one embodiment, the VPN 120 provides a virtual server architecture managed by an organization. Illustratively, the VPN 120 includes a load balancer 121, a cluster 122 of application servers 123, a management server 124, and a data store 125. In this example, the application servers 123 execute a VoIP application stack that generally provides video chat, text messaging, and voice call services to the organization. For instance, a client in the organization may initiate a voice call by sending a request towards the VPN 120. The load balancer 121 receives and routes the request to one of the application servers 123 (which then handles the request for the client).

The management server 124 maintains a configuration of the cluster 122. For instance, the management server 124 may maintain, in the data store 125, markup language files that contain network addresses for each of the application servers 123 and define roles for each of the servers. The management server 124 may also configure routing tables for handling network traffic of the VoIP application. In one embodiment, the management server 124 may be a virtualized server instance in the VPN 120.

The servers in the cluster 122 are virtualized server instances executing atop any number of physical hardware resources, e.g., via a hypervisor that manages the allocation of the physical hardware resources to each instance. Each of the application servers 123 are generally provisioned on-demand, e.g., via the management console 130. That is, a user (e.g., an administrator) can specify a number of instances of application server 123 to execute at any given time as well as configure memory, CPU, and storage for each instance. Further, the servers of cluster 122 are part of an auto-scaling group. That is, the additional instances of the application server 123 can be automatically provisioned based on observed metrics in the cluster 122. Further still, the cluster 122 includes a configuration store 126 that maintains application-specific configurations for each the application servers 123. For instance, in the VoIP application example, the configuration store 126 may include markup language files containing metadata describing roles performed by each application server 123, network addresses of each application server 123, and routing tables maintained by each application server 123. An application server 123 may access the configuration store 126 to determine a current configuration or to update its configuration on the cluster 122. Note, although FIG. 1 depicts the configuration store 126 as a single store shared by each application server 123, other implementations, such as separate stores assigned to each application server 123, may be adapted.

In practice, the actual arrangement of servers executing in the VPN 120 for the application stack may differ. For instance, in another embodiment, the management server 124 is not present because the application stack might not require a centralized server to maintain a configuration of the application server topology. Instead, the application servers 123 may individually maintain a configuration of the cluster 122. For example, the application servers 123 may store a local configuration file that can be updated as part of a distributed service, such as through a directory service executing on each of the application servers 123.

In addition, the configuration of the servers executing in the VPN 120 differs based on the underlying application. As an example, an ERP application stack may, instead of using a centralized management server or an application-specific configuration store, maintain a database that includes a configuration of the application servers 123. Thus, updates to the cluster for such an application would be made to the database, e.g., to add or remove application servers in the cluster.

As shown, the metrics repository server 110 includes a monitoring service 111, metrics 112, and policies 113. In one embodiment, the monitoring service 111 collects the metrics 112 from components of the VPN 120 (e.g., the load balancer 121, cluster 122, and management server 124). Generally, the metrics 112 are statistics observed in the cluster 122 and formatted by the monitoring service 111 as an ordered set of time-series data. For instance, metrics 112 can include statistics relating to resource utilization of the application servers 123 in the cluster 112, such as CPU resource utilization, latency, request counts, and so on. Further, metrics 112 may also relate to the cluster 112 as an auto-scaling group. Such metrics 112 may include the number of instances in the auto-scaling group, a maximum number of instances, and a minimum number of instances.

In one embodiment, the user may specify via the management console 130 one or more triggering conditions as part of an auto-scaling policy 113. In particular, the triggering conditions describe conditional events for provisioning additional (or for terminating) server instances in the cluster 122 to account for increasing (or decreasing) demand of system or application resources. For example, triggering conditions can include a given metric exceeding a specified threshold. In addition, triggering conditions relating to application-specific parameters may be defined as part of a policy 113. For instance, using the VoIP application as an example, the user may specify triggering conditions for a total number of concurrent phone calls, a total number of concurrent voice chat sessions, a total number of clients logged into the VoIP application service, and the like. The monitoring service 111 may notify the auto-scaling server 115 when a given condition is triggered. For example, the monitoring service 111 may generate an indication that describes what condition was triggered, metrics associated with the triggered condition, whether to scale resources up or down, and so on. The monitoring service 111 can then send the indication to the auto-scaling server 115, which, in turn, may increase or decrease instances in the cluster 122.

As shown, the auto-scaling server 115 includes a deployment engine 117, a configuration engine 118, and configuration packages 119. The deployment engine 117 provisions additional instances of the application server 123 in response to increased demand of cluster 122 resources or if an application-specific condition is triggered. Settings such as the amount of instances to provision, the type of operating system to execute on the instance, and resource allocation may be based on configuration and cost specifications by the user. The deployment engine 117 registers the new instances with the load balancer 121 and adds the instances to the cluster 122.

Some applications, such as the VoIP application, are not typically designed to self-configure when a logical server instance is added to a cluster. As a result, if a new server instance is added to the cluster, the instance might not be configured to route server requests to a proper destination when received by the load balancer 121. As will be further described, in one embodiment, the auto-scaling server 115 provides the configuration engine 118 to automatically configure the cluster 122 when a new instance is added or removed, using a configuration package 119 associated with the underlying application. In particular, the auto-scaling server 115 also provides a data store of configuration packages 119. Each of the configuration packages 119 is associated with a given application (e.g., with the VoIP application) and contains application-specific scripts and data used to update a cluster when instances are added or removed.

Figure 2:
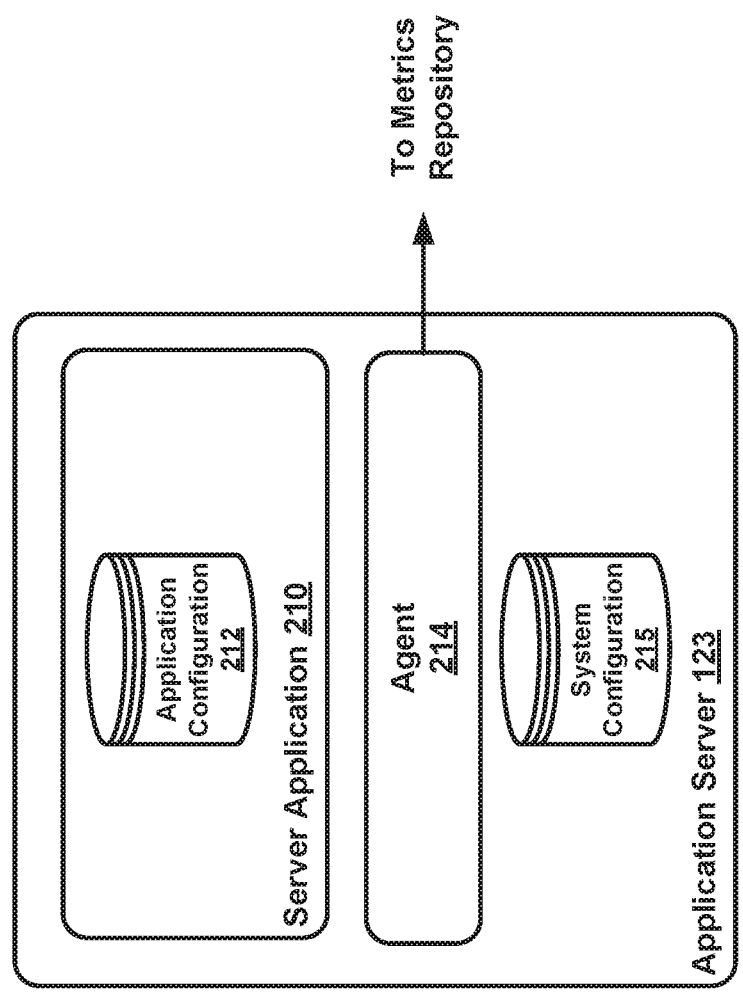
FIG. 2 illustrates an example application server instance executing in a virtual private network, according to one embodiment.

FIG. 2 illustrates a conceptual diagram of an example application server instance executing in the VPN 120, according to one embodiment. As shown, the application server 123 includes a server application 210, an agent 214, and a system configuration 215. Generally, the application server 123 is a virtualized server instance running atop underlying physical hardware via a hypervisor. The server application 210 generally comprises the software processes that perform the services provided by the VoIP application stack.

When provisioned, the application server 123 is booted from a pre-configured virtual machine image that contains a template for the root volume of the instance (e.g., an operating system, server application 210, and the agent 214), launch permissions, and block device mappings to the data store 125. The virtual machine image itself may have a predefined system configuration 215 that specifies resource provisions for the application server 123, such as an amount of memory, processing, and capacity allocated to the application server 123. When the application server 123 initially launches, the deployment engine 117 executes a bootstrap process to configure the VoIP application for that application server 123. Generally, the bootstrap process executes scripts used to install the application and start services provided by the application. For instance, the bootstrap process launches a script including commands for registering the application server 123 with the load balancer 121. The script may also run commands for installing services (e.g., a voice processing service, relay processing service, call managers, etc.) and drivers for the VoIP application on the application server 123. The script may also include settings for each of the installed services in an application configuration 212.

Further still, the bootstrap process may, via the script, initialize the agent 214 to collect application-specific metrics specified in the application policy 113. At initialization, the agent 214 receives a policy 113 specified for the VoIP application. The agent 214 identifies, in the policy 113, application-specific metrics to monitor during runtime of the application 210. Once identified, the agent 214 creates application programming interface (API) hooks to the application 210 to monitor the events passed between components of the application 210. The agent 214, via the hook, identifies events corresponding to the specified metrics (e.g., using some mapping between event identifiers to the metrics). The agent 214 transmits the events as metrics to the metrics repository server 110.

In one embodiment, when the user initially configures the cluster 122 as an auto-scaling group via the management console 130, the management console 130 may prompt the user to specify settings for the underlying virtual machine image to execute. For instance, the management console 130 may provide, via a drop-down box on a user interface, a given application stack that servers on the cluster 122 will run. The drop-down box lists application stacks for selection to run on the application servers 123, and can include a number of closed-source applications supported by the IaaS provider as well as custom applications of the organization.

Figure 3:
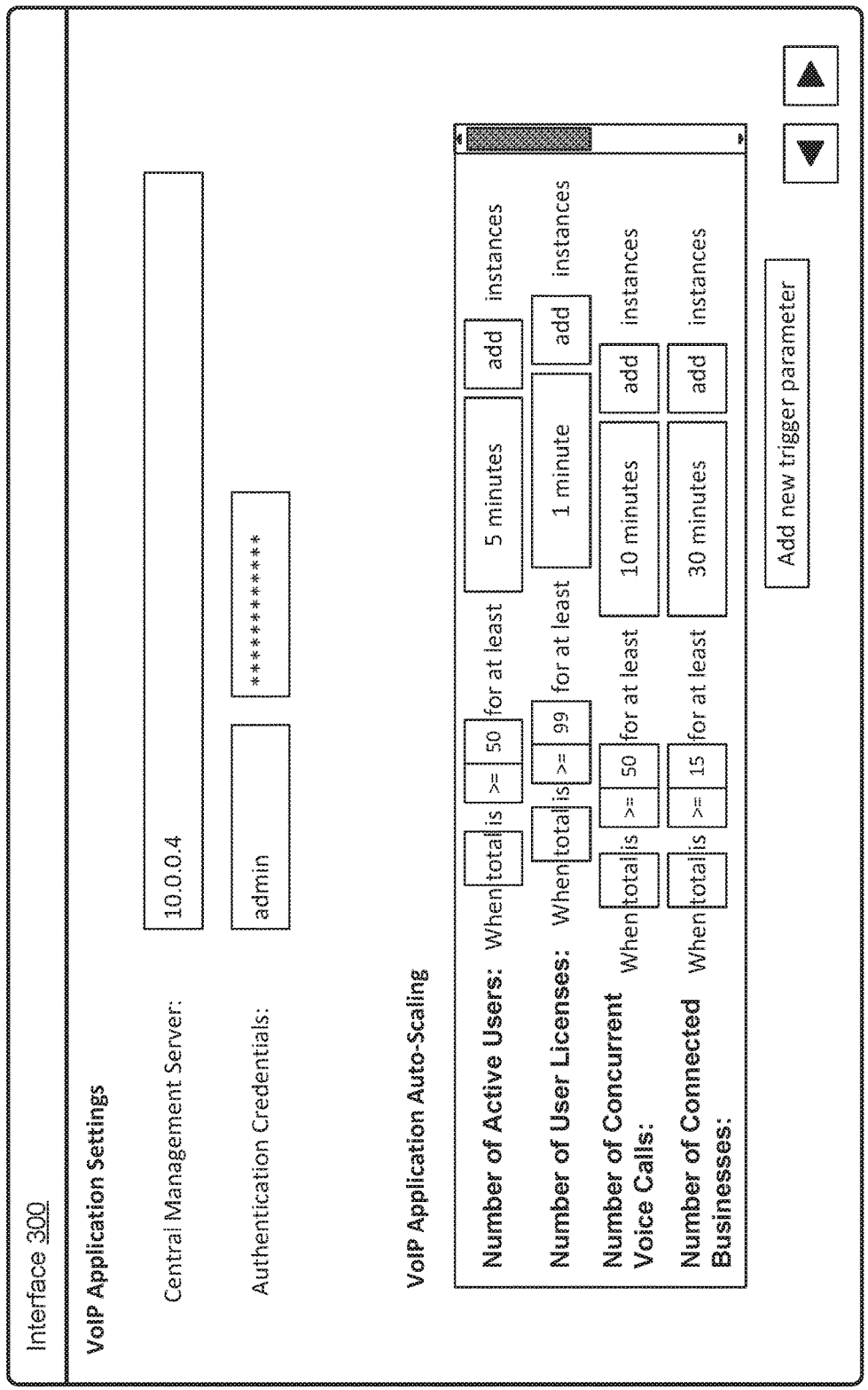
FIG. 3 illustrates an example interface for configuring auto-scaling parameters of an application stack, according to one embodiment.

Once an application stack is selected, the user interface may prompt the user to specify auto-scaling settings specific to the application stack. FIG. 3 illustrates an example interface 300 for configuring auto-scaling parameters of an application stack, according to one embodiment. Illustratively, the example interface 300 presents settings and auto-scaling triggering conditions that a user may configure for a VoIP application. Note, although the interface 300 provides such triggering conditions for the application level, standard auto-scaling triggering conditions relating to resource utilization may also be configured for the cluster 122 in addition. Further note that the interface 300 portrays merely an example of settings and application-specific triggers that may be displayed to a management console for configuring application settings and auto-scaling triggers. In practice, the management console may provide multiple interfaces (e.g., separate interfaces for the settings and the auto-scaling triggers, including additional settings to configure, and the like).

The interface 300 prompts the user to specify settings to be configured with each instance added to the cluster 122. Illustratively, the interface 300 includes fields where the user can enter a network address of a central management server for the VoIP and authentication credentials for accessing the central management server. In practice, the interface 300 may provide additional configuration settings that the user may specify for the application. For example, the interface 300 may provide a field allowing the user to specify a network location of a configuration data store.

Illustratively, the interface 300 also allows the user to add triggering conditions for scaling new instances (or removing instances) from the cluster 122. For example, the user can click on the "Add new trigger parameter" button and select from a predefined listing of metrics associated with the VoIP application. For example, the user might select "Number of Active Users" as a metric to set as an auto-scaling parameter. Once selected, the interface 300 may display the metric on a list and prompt the user to specify conditions upon which to add or remove instances from the cluster 122. As shown, examples of metrics specific to the VoIP application are a number of active users, a number of licensed users, number of concurrent voice calls, and number of connected businesses. For instance, the user may specify that when a total amount of active users connected to the server is greater or equal than fifty users for at least ten minutes, add instances to the cluster, as depicted in FIG. 3.

As stated, the triggering conditions are associated with the VoIP application itself. Consequently, triggering conditions for the application level may vary depending on the application. For example, in the case of an enterprise resource planning (ERP) application, triggering conditions can include a number of concurrent ERP forms, number of licensed users, number of associated organizations, and the like. As another example, in the case of an enterprise automated billing system, triggering conditions can include a number of accounts, number of ledgers, number of payments due in a period, and the like.

In one embodiment, the management console 130 may register the specified settings as configuration data with a configuration package 119 associated with that application and user. The configuration engine 118 may populate scripts included in the configuration package with the specified settings. Further, the management console 130 may register the specified triggering conditions with the metrics repository server 110 and the deployment engine 117.

Figure 4:
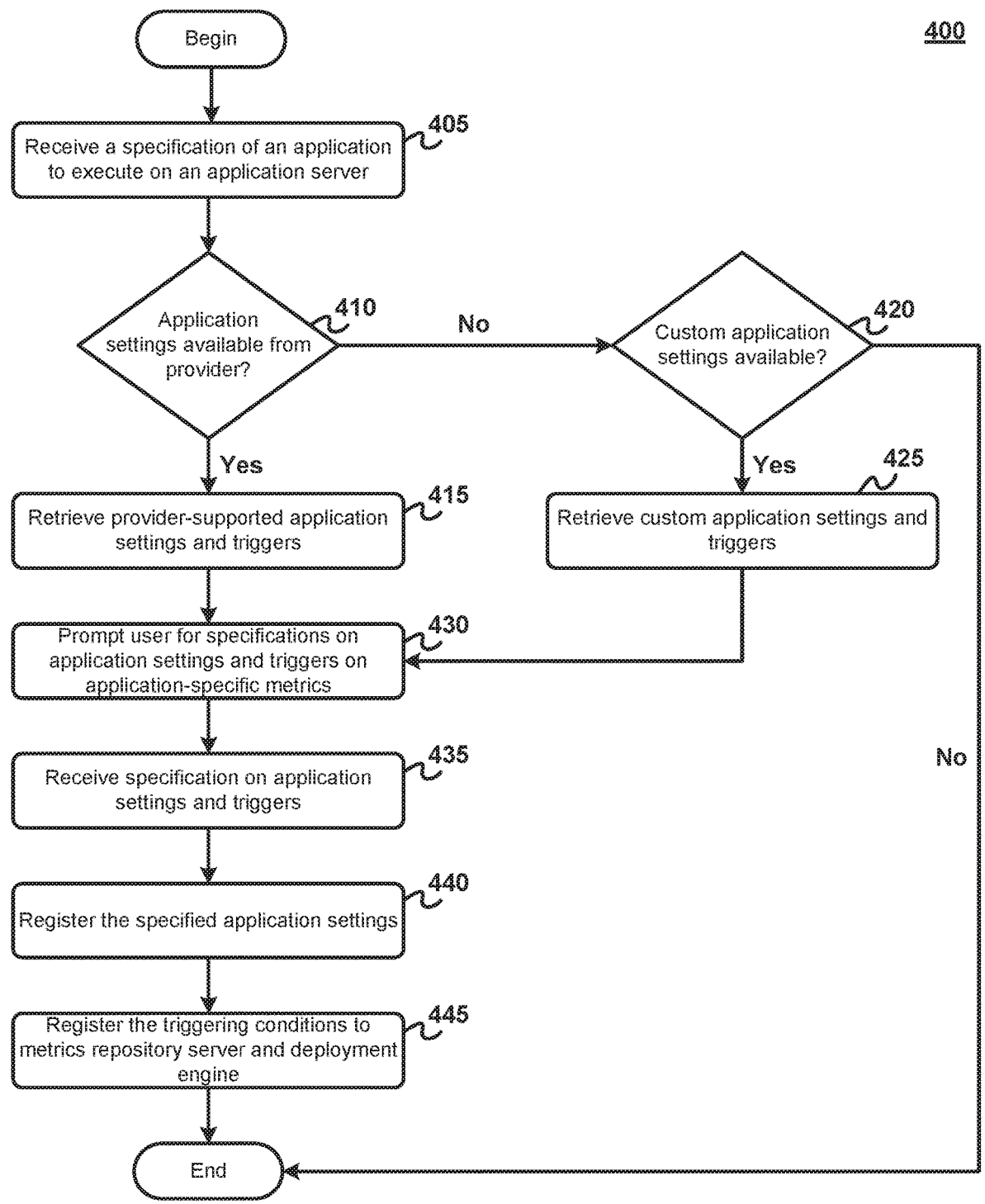
FIG. 4 illustrates a method for registering application specific-metric thresholds, according to one embodiment.

FIG. 4 illustrates a method 400 for registering application specific-metric thresholds, according to one embodiment. At step 405, the management console 130 receives a specification of an application to execute on an application server. For example, the user may, via a user interface on the management console, select an application to execute on a cluster 122 by entering the name of the application in a field provided by the user interface. At step 410, the management console 130 determines whether settings and triggers are available from the service provider. The IaaS provider may support a number of closed-source enterprise applications and provide predefined settings for the supported applications. However, in the event that the service provider does not include support for an application, custom settings may be available and loaded into the management console 130.

If the application settings are available from the provider, then at step 415, the management console 130 retrieves the provider-supported application settings and auto-scaling triggers, e.g., from a storage location maintained by the service provider. Otherwise, at step 420, the management console 130 determines whether custom settings are available for the specified application. If not, then the management console 130 returns an error, and the method 400 ends. If so, then at step 425, the management console 130 retrieves the custom application settings, e.g., from a storage location on the service provider where the settings have been uploaded. The management console 130 may present the settings and triggers via a configuration menu associated with the selected application, such as that provided by the interface 300. In response, the management console 130 may load an auto-scaling configuration menu, such as that provided by the interface 300. The management console 130 may populate the configuration menu with the retrieved application settings and triggers.

At step 430, the management console 130 prompts the user for specifications on application settings and auto-scaling triggering conditions via the auto-scaling configuration menu. As discussed above, the settings are specific to the application itself. For instance, given the example of the VoIP application, settings can include a network address of a central management server, authentication credentials (e.g., for the central management server), a network storage location of a configuration file, and the like. Similarly, the metrics associated with auto-scaling triggering conditions are also specific to the application and thus can differ based on the selected application. In this example, the management console 130 may provide a list of metrics to the user to select and specify condition for those metrics (e.g., triggering an auto-scale flow when a number of concurrent voice calls is greater than seventy-five for a period of at least ten minutes).

At step 435, the management console 130 receives specification on the application settings and triggers. The management console 130 may write the specification of settings and triggers to a temporary buffer. At step 440, the management console 130 registers the specified application settings with the configuration engine 118. In turn, the configuration engine 118 may create a copy of a configuration package 119 associated with the application. The configuration engine 118 may further associate the configuration package 119 copy with the cluster 122. Further, the configuration engine 118 populates corresponding portions of the script with the specified application settings. For example, the configuration engine 118 may insert specified central management server information to portions of the configuration package 119 scripts that use such information. Further still, the configuration engine 118 may also dynamically generate automated configuration scripts using the specified settings.

At step 440, the management console 130 registers the auto-scaling trigger conditions to the metrics repository server 110 and the deployment engine 117. In turn, the metrics repository server 110 may associate the specified conditions with the cluster 122, e.g., in a database table of application cluster configurations. The deployment engine 117 may associate the specified conditions with a scaling configuration of the cluster 122, maintained on the auto-scaling server 115.

Figure 5:
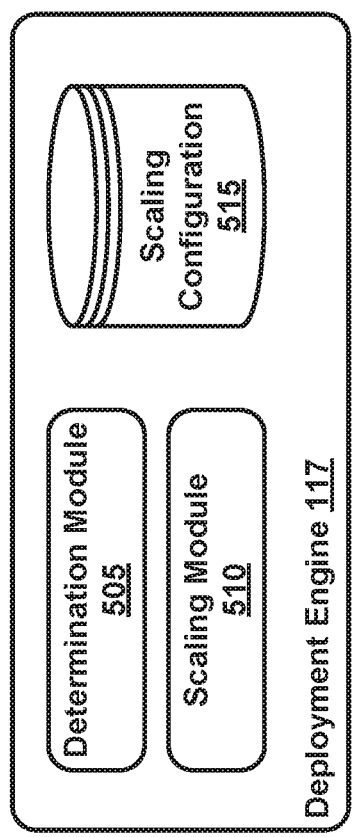
FIG. 5 further illustrates the deployment engine described relative to FIG. 1, according to one embodiment.

FIG. 5 illustrates a conceptual diagram of the deployment engine 117 described relative to FIG. 1, according to one embodiment. As shown, the deployment engine 117 includes a determination module 505, a scaling module 510, and a scaling configuration 515.

The determination module 505 receives indications from the monitoring service 111 if a specified metric 112 triggers a specified condition in a policy 113 associated with a given cluster, e.g., if a resource metric triggers a condition, if an application-specific metric triggers a condition, etc. Such an indication may identify the associated cluster (e.g., in this case, the cluster 122) and provide metadata describing, e.g., the metric, the triggered condition, and a timestamp. The determination module 505 then directs the scaling module 510 to create (or destroy) instances in response to the triggered condition.

The scaling module 510 retrieves the scaling configuration 515 associated with the cluster 122. The scaling configuration 515 provides an auto-scaling policy for the cluster 122. For example, the scaling configuration 515 may specify a maximum amount of application servers 123 that can run in the cluster 122 at a time, how many instances to add to a cluster when scaling up, fault tolerance settings, and the like. The scaling module 510 provisions or de-provisions instances in the cluster 122 according to the scaling configuration 515 in response to communications sent by the determination module 505.

For example, if the scaling module 515 needs to add new application server instances, the scaling module 515 may retrieve a virtual machine image associated with the application servers 123 (e.g., from the data store 125). The scaling module 515 may then instantiate one or more instances from the virtual machine image according to specifications in the scaling configuration 515. Further, the scaling module 515 launches a bootstrap process, which, as stated, runs scripts for installing application services on each individual instance. The scaling module 515 may then boot the instances.

As stated, new instances may require further configuration to run as part of the cluster 122, e.g., other pre-existing instances are not yet configured to recognize the new instances, the new instances might not be configured to handle traffic received from the load balancer 121, etc. Similarly, if the scaling module 515 needs to terminate application server instances from the cluster 122, the remaining application server instances might not recognize that the application server instances were terminated, resulting in, e.g., attempted communications to the terminated instances.

Figure 6:
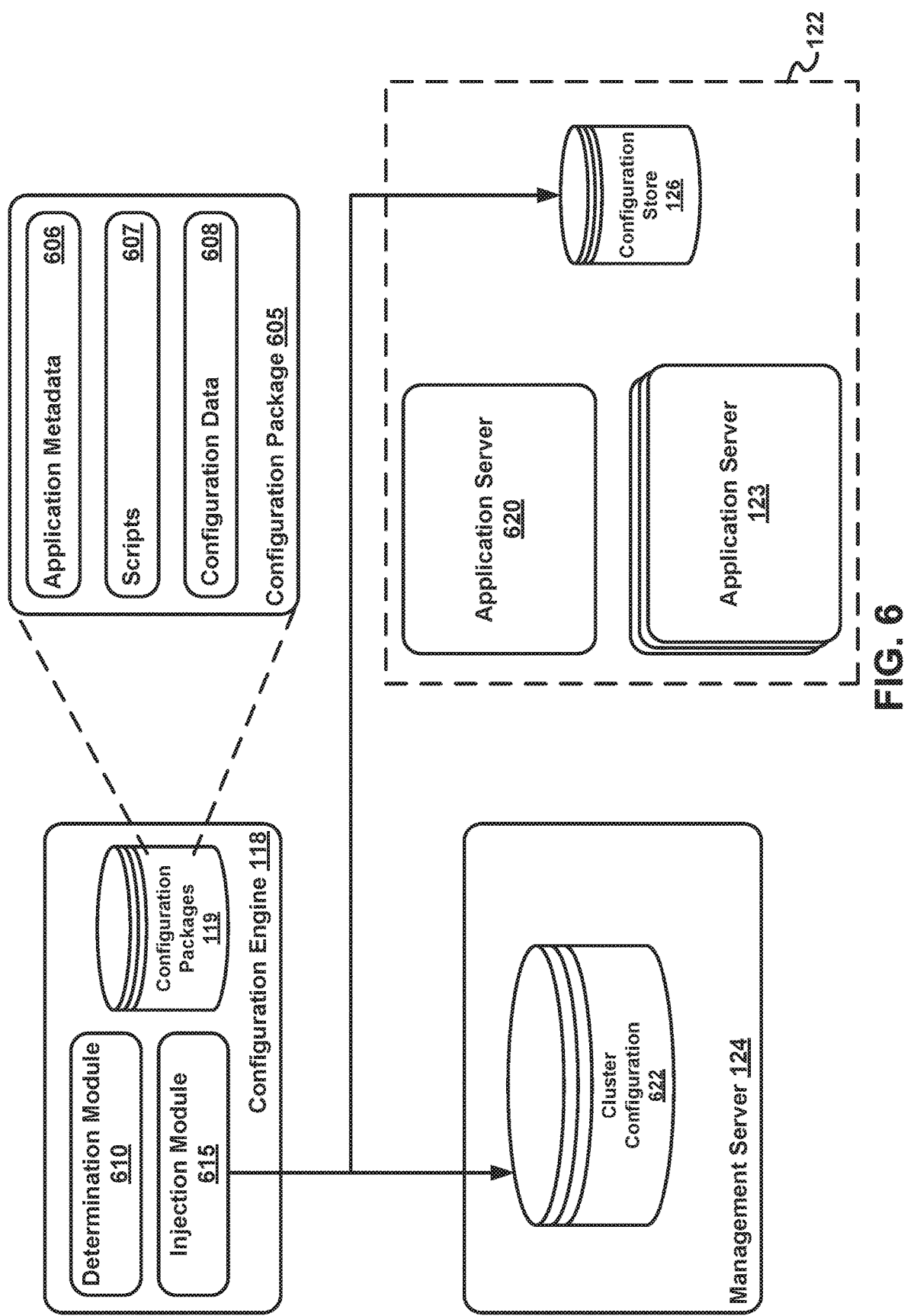
FIG. 6 further illustrates the configuration engine described relative to FIG. 1, according to one embodiment.

FIG. 6 further illustrates the configuration engine 118, according to one embodiment. As shown, the configuration engine 118 includes a determination module 610, an injection module 615, and the configuration packages 119. As shown, the configuration engine 118 includes a determination module 610 and an injection module 615. The determination module 610 may receive an indication from the deployment engine 117 that new instances of the application server 123 have been added to (or removed from) the cluster 122. When an indication is received, the determination module 610 retrieves a configuration package associated with the cluster 122 from storage. Further, the determination module 610 may determine the application server instances in the cluster 122 to configure, in addition to the application server 620. To do so, the determination module 610 may evaluate the cluster configuration 622 to identify the instances running in the cluster 122. The evaluation can include determining which instances store a configuration file that needs to be modified for the new instance to function with the cluster 122.

FIG. 6 also depicts an example configuration package 605, which includes application metadata 606, scripts 607, and configuration data 608. The application metadata 606 describes information regarding the application, such as name, version, OS, and the like. The application metadata 606 may also include an identifier associating the configuration package 605 with a given application server cluster. The scripts 607 include functions that automatically configure new instances (e.g., the application server 620) with the rest of the cluster. In one embodiment, the scripts 607 may be created under a framework that provides a command-line shell and associated scripting language for task automation and configuration management. The configuration data 608 includes settings for the application (e.g., network addresses of central repositories, network locations for configuration files, etc.). The settings may be previously specified during configuration of the auto-scaling services on the cluster 122 (such as through the example interface 300).

The determination module 610 may send the configuration package 119 associated with the application server cluster 122 to the injection module 615. In turn, the injection module 615 sends the configuration package 119 to one or more servers executing as part of the application stack. For instance, given the example of the VoIP application, the injection module 615 may send the configuration package to the management server 124 and the configuration store 126. The injection module 615 triggers an event-driven computing service to unpack the configuration package 119 and run the scripts. For example, the event-driven computing service executes in the background of the management server 124 and invokes a function to do so. Similarly, the event-driven computing service may also execute the scripts in the configuration store 126.

Generally, the event-driven computing service allows custom-written code to be automatically executed in response to some trigger. For instance, the configuration engine 118 may define an event of the injection module 615 sending the configuration package 119 to the application stack. When the event occurs, the configuration engine 118 may publish the event to the event-driven computing service, which, in turn, invokes the function to unpack the configuration package 119 and execute the configuration scripts. Further, an initial boot of the new instances may also trigger the event-driven computing service to execute additional scripts to add the instances to the topology specified in the cluster configuration 622. However, using the event-driven computing service is merely an example of an automated approach for executing the scripts in the VPN 120. Other methods to run the scripts may also be adapted. For example, an additional server may be provisioned to the VPN 120 that triggers the execution of scripts on the management server 124.

For instance, the management server 124 may also execute an application 620 that maintains a cluster configuration 622. The cluster configuration 622 may be a markup language file (e.g., an XML file) that includes server information for the cluster 122, e.g., network addresses for the servers, server roles, and the like. Application servers 123 may include an application service that periodically checks the cluster configuration 622 to identify a current server topology of the cluster 122 (e.g., by sending a request to the management server 124 to return the current cluster configuration 622). The scripts, when run, perform commands for modifying the cluster configuration 622 to add instances to the server topology. As a result, the service may retrieve the most up-to-date server topology when checking the cluster configuration 622 and update the configuration store 126 on the cluster 122, which in turn allows the additional application server instances to execute the application as part of the cluster (e.g., route network traffic to proper destinations, execute the application according to an assigned server role, and the like).

For example, for the VoIP application, the scripts may insert markup language tags including metadata describing the new server instances (e.g., network addresses, name, role, and the like). Further, the scripts may modify the configuration of individual instances in the cluster 122 (i.e., the pre-existing server instances in the cluster) and the configuration store 126. For example, if the application servers 123 are configured to locally store a topology of the cluster 122, the scripts may include commands for adding metadata of the new instances to a locally stored file containing the topology. In such a case, the injection module 615 may send the configuration package to each individual application server 123 (and/or to the configuration store 126) and trigger the execution of the package scripts on the servers 123. As another example, configuration for servers executing a stack corresponding to an ERP application might be located in a central database. The associated configuration package may include scripts that access the central database to include server metadata for the additional instances.

The deployment engine 117 may terminate instances from the cluster 122 in the event that metrics 112 observed by the monitoring service 111 trigger a condition specified in the policy 113, e.g., if the number of concurrent calls in the cluster 111 falls below a threshold for a given amount of time. Once terminated, the injection module 615 may communicate with the event-driven computing service to invoke a function to execute scripts for modifying the configuration of the cluster 122, e.g., removing the terminated instance information from the cluster configuration 622 and on locally stored configurations of the application server instances 123.

Figure 7:
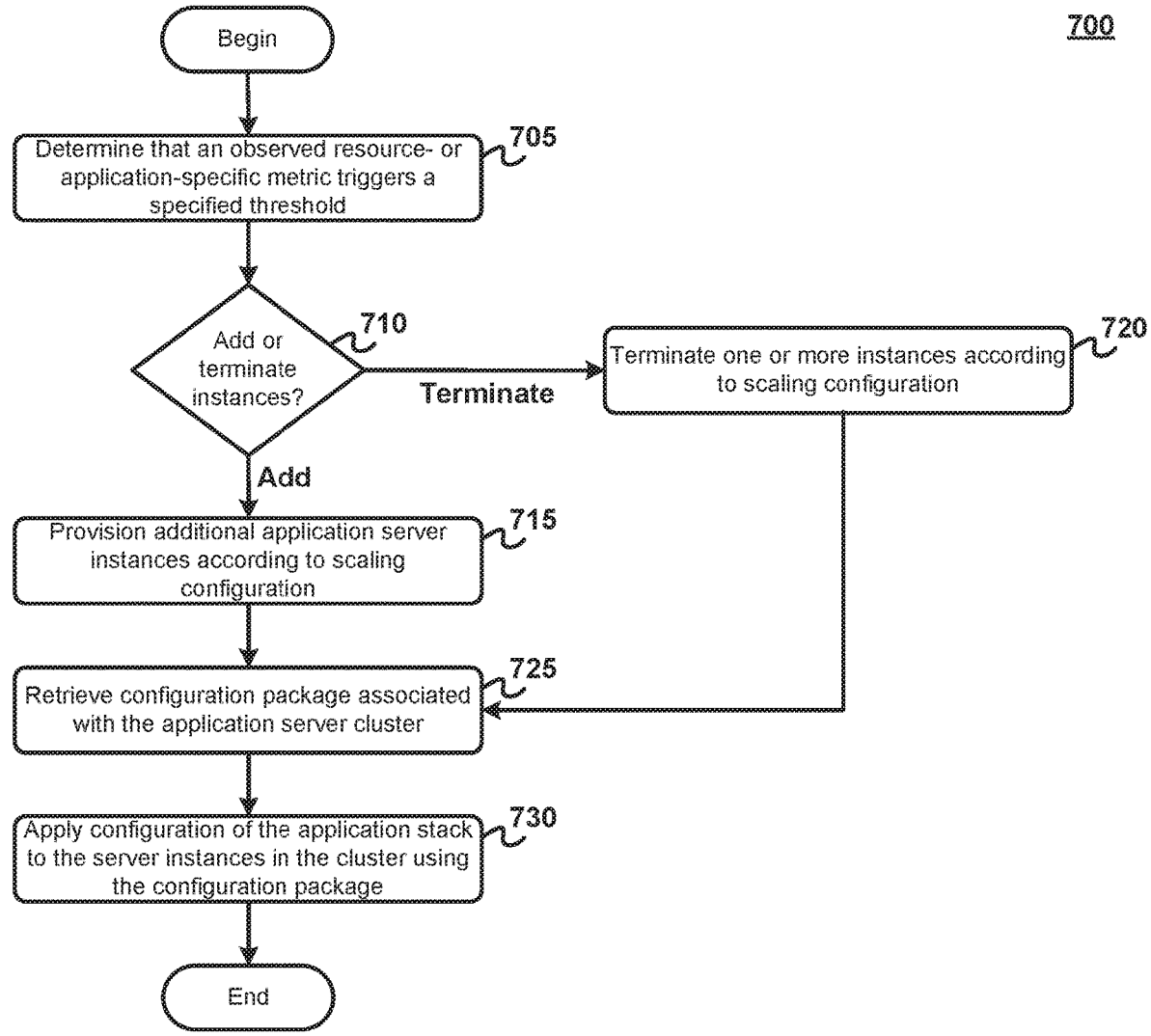
FIG. 7 illustrates a method for provisioning instances of an application server cluster, according to one embodiment.

FIG. 7 illustrates a method 700 for provisioning additional application server instances to a cluster, according to one embodiment. As shown, the method 700 begins at step 705, where the deployment engine 117 determines that one of the metrics observed by the metrics repository server 110 triggers an auto-scaling condition. The metrics can include resource utilization metrics (e.g., CPU utilization, memory usage, etc.) or application-specific metrics specified in a policy 113 associated with the cluster 122. Using the VoIP application as an example, application-specific metrics may include a number of concurrent calls, number of active users, number of connected users, and the like. The metrics repository server 110 may send an indication to the deployment engine 117 that one of the conditions has been triggered.

At step 710, the deployment engine 117 determines, based on the indication sent by the metrics repository server 110, whether to add application server instances to or remove application server instances from the cluster 122. For instance, the indication specifies which condition was triggered and a directive of whether to add or terminate instances. For example, the indication might provide that a number of concurrent voice calls on each application server 123 exceeds fifty calls, in response to such an event, the cluster should add new application server instances. As another example, the indication might provide that a number of active users logged into the VoIP service on each server falls below one hundred users, If the indication specifies to add application server instances to the cluster 122, then at step 715, the deployment engine 117 provisions additional application server instances according to the scaling configuration 515. In particular, the scaling module 510 may evaluate the scaling configuration 515 and determine an amount of server instances to add to the cluster. The scaling module 510 then retrieves a virtual machine image having the underlying application and instantiates the instances from the image. The scaling module 510 executes a bootstrap process on each new instance to install application services on the instance as well as register the instance with the load balancer 121.

Otherwise, if the indication specifies to delete instances from the cluster, then at step 720, the deployment engine 117 terminates one or more instances according to the scaling configuration 515. In particular, the scaling module 510 may determine an amount of instances to terminate to satisfy the scaling configuration 515. Further, the scaling module 510 may determine which instances can be terminated, e.g., based on fault tolerance policies for the cluster 122. Once determined, the provisioning module 510 terminates the instances.

At step 725, the configuration engine 118 retrieves a configuration package 119 associated with the cluster 122. The configuration engine 118 also determines which servers of the application stack should be configured as a result of the scaling. For example, the configuration engine 118 may evaluate a cluster configuration file, e.g., maintained by a central management server on the cluster. Once retrieved, at step 730, the configuration engine 118 applies the service configuration to the application stack using the configuration package 119. For example, assume that the deployment engine 117 provisions one or more new application server instances to run the VoIP application in the cluster 122. In such a case, the injection module 615 may unpack the configuration package 119 and send the scripts and service configuration data of the package to the management server 124. At initialization of each new instance, the injection module 615 triggers the execution of the scripts, e.g., by a function invoked by the event-driven computing service.

For example, the function may initiate a run command to execute the script on the new instance. And the script may contain commands that automatically configure the new instance with cluster information, e.g., topology and server information. In the VoIP application example, the script commands can include logging into the management server 124 (e.g., using authentication credentials provided at initial configuration of the cluster 122), accessing a configuration file on the management server 124, and populating the configuration file with metadata associated with the new application server instance, such as a network address, server role, routing information, and the like.

As another example, assume that the deployment engine 117 terminates one or more existing application servers 123 from the cluster 122. In such an example, the injection module 615 sends the configuration package 119 to the management server 124. The server instances being terminated and the management server 124 may trigger the event-driven computing service to invoke a function for unpacking the configuration package 119 and executing scripts for updating the cluster 122 to account for the removal of the instances from the cluster. For instance, the scripts may include commands for logging into the management server 124 (e.g., using authentication credentials provided by the user), accessing the configuration file maintained by the management server 124, and removing server metadata associated with the terminated instances in the configuration file.

Further, the script also modifies the service configuration of the cluster such that the other servers in the cluster are aware of the current topology. For example, the script may access a file containing the cluster configuration 622 on the management server 124 and update the application server topology to be current with the servers running the application. In turn, the management server 124 may broadcast the updated topology to the other servers in the cluster 122. In some cases, the script may access the other servers in the cluster 122 to modify local topology configurations, e.g., to include the new instances to remove terminated instances from the configurations.

Further still, the injection module 615 may also directly send the configuration package 119 to individual application servers 123 and trigger execution of the scripts on each application server 123. For example, given the architecture of an underlying application stack, some closed-source applications might not provide a central management server used to configure an application server cluster, and instead, individual application servers maintain a local configuration of the cluster topology. In such an example, the scripts provided by the configuration package 119 may include commands for adding server metadata for any new instances, or removing server metadata for terminated instances directly on a configuration file maintained by the application server.

Figure 8:
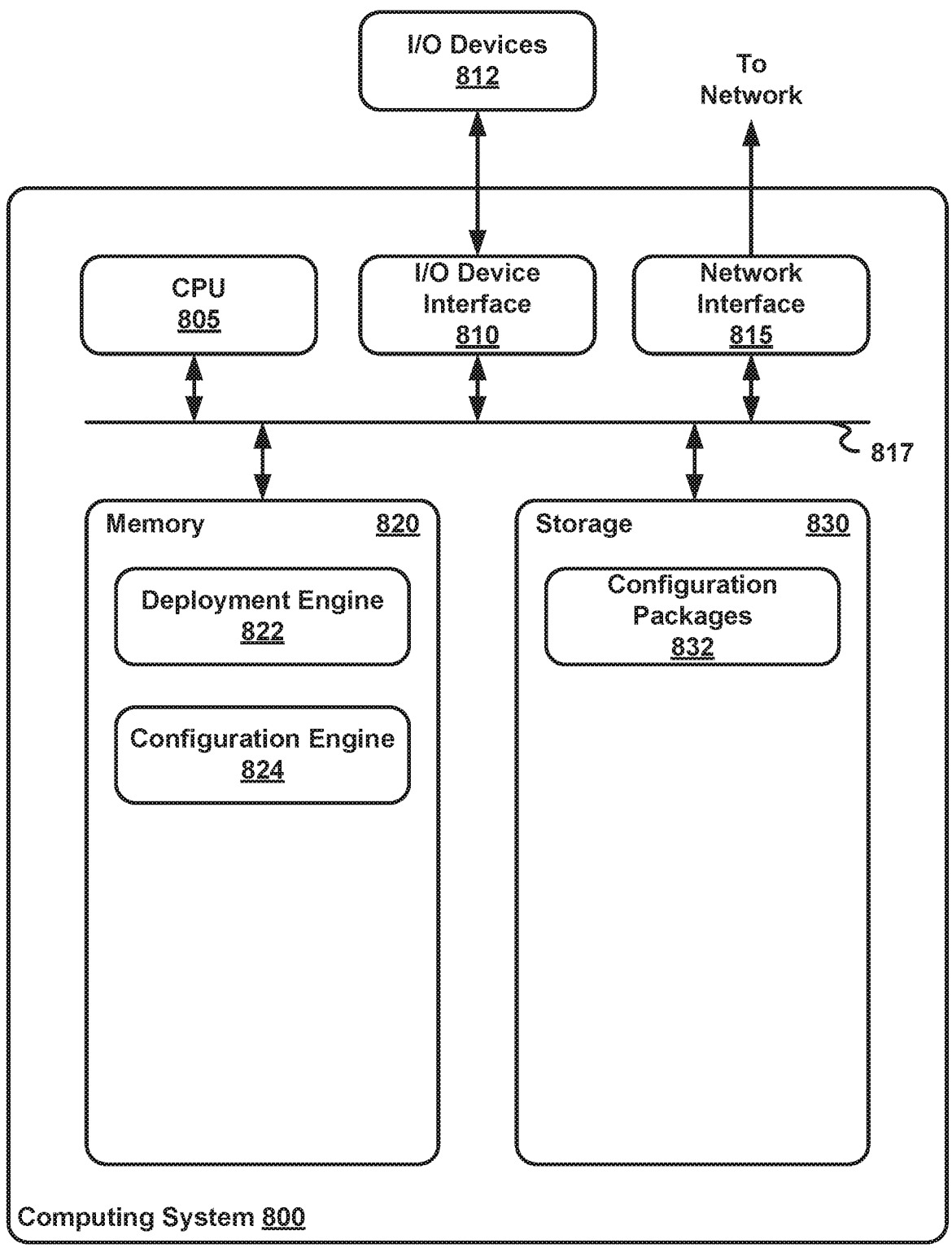
FIG. 8 illustrates an example computing system used to provision computing instances in an application server cluster, according to one embodiment.

FIG. 8 illustrates an example computing system 800 configured to provision (and de-provision) computing instances in an application server cluster on a service provider, according to one embodiment. As shown, the computing system 800 includes, without limitation, a central processing unit (CPU) 805, a network interface 815, a memory 820, and storage 830, each connected to an interconnect bus 817. The computing system 900 also includes an I/O device interface 810 connecting I/O devices 812 (e.g., keyboard, display and mouse devices) to the computing system 800. In context of this disclosure, the components shown in computing system 800 correspond to both physical computing systems (e.g., a system in a data center) as well as components of a virtual machine (VM) instance executing within a computing cloud. Further, the service provider could offer components of the auto-scaling services accessed using a network browser or dedicated console application (e.g., console applications to configure and monitor auto-scaling configurations). Further still, while shown as running on a single computing server 800, components in memory 820 and storage 830 may be deployed across multiple computing servers.

CPU 805 retrieves programming instructions and application data stored in the memory 820 and storage 830. The interconnect bus 817 is used to transmit programming instructions and application data between the CPU 805, I/O device interface 810, storage 830, network interface 815, and memory 820. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes a deployment engine 822 and a configuration engine 824. Storage 830 includes configuration packages 836. As described, the deployment engine 822 is generally configured to provision additional instances (or terminate instances) on a cluster of virtual application server instances hosted on a virtual private cloud of a user (e.g., an enterprise, individual, organization, etc.) in response to an auto-scaling condition being triggered within the virtual private cloud. The provisioned instances may execute a closed-source application stack that typically does not re-configure the application to reflect changes to the cluster as a result of auto-scaling. To address this issue, the configuration engine 824 may retrieve a configuration package 832 associated with the application stack and cluster and inject the configuration package 832 to the virtual private cloud, such as to a centralized management server that maintains a configuration of the application stack and/or to individual application server instances. The configuration engine 824 may also trigger the execution of scripts included with the configuration package 832 (e.g., via a function invoked on an event-based computing service) to automatically configure the servers of the cluster to recognize new instances at an application level.

In the preceding, reference is made to embodiments presented in this disclosure. However, the scope of the present disclosure is not limited to specific described embodiments. Instead, any combination of the preceding features and elements, whether related to any given embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for configuring a computing instance to execute an application as part of a cluster, the computer-implemented method comprising:
    provisioning, based at least in part on operational metrics of the cluster, at least a first computing instance to execute the application for providing a service, wherein the first computing instance is provisioned in response to a policy for the cluster, wherein the cluster has a plurality of second computing instances, wherein each second computing instance executes the application as part of the cluster;
    determining which of the plurality of second computing instances to configure so that the first computing instance and the plurality of second computing instances can execute the application as part of the cluster, said determining comprising, for particular second computing instances of the plurality of second computing instances:
        retrieving, from the particular second computing instance, a configuration file indicating a topology of the cluster and a role of the particular second computing instance within the topology of the cluster; and
        determining, based on the configuration file, whether the particular second computing instance needs to be modified to account for the first computing instance;
    automatically reconfiguring the application to account for the first computing instance, by operation of one or more computer processors and by invoking a function via an event-driven computing service in order to execute one or more scripts specific to the application, wherein the reconfiguring includes applying a service configuration to a configuration file of the first computing instance to the configuration files of the determined second computing instances of the cluster to include the first computing instance as executing the application as part of the cluster, wherein the service configuration is defined based on the cluster;
    determining that the operational metrics of the cluster trigger a scaling workflow based on the policy;
    instantiating the scaling workflow by terminating at least one of the first computing instance and the second computing instances according to the policy; and
    further executing the one or more scripts in order to update the topology of the cluster in each of the computing instances that were not terminated, wherein the one or more scripts remove the terminated at least one of the first computing instance and the second computing instances.

2. The computer-implemented method of claim 1, wherein the service configuration provides the one or more scripts, which include commands for updating the topology of the cluster in an application configuration file.

3. The computer-implemented method of claim 2, wherein the one or more scripts further include commands for updating the topology of the cluster in the configuration file of the first computing instance and the configuration files of the determined second computing instances.

4. The computer-implemented method of claim 1, further comprising:
    receiving an indication from a metrics repository service that the operational metrics trigger a condition for initiating the scaling workflow for provisioning the first computing instance, wherein the condition is specified in a scaling policy and wherein the indication includes at least one of a description of the condition, whether to increase computing instances in the cluster and at least one of the operational metrics associated with the condition.

5. The computer-implemented method of claim 4, wherein the application is a Voice-over-Internet-Protocol (VoIP) application, and wherein the metrics include at least one of a number of concurrent voice calls, a number of active users, and a number of user licenses.

6. A system for service configuration of a computing instance to execute an application as part of a cluster in a service provider environment, comprising:
    one or more computer processors; and
    a memory storing instructions which, when executed by the one or more computer processors, perform an operation comprising:
        provisioning, based at least in part on operational metrics of the cluster in the service provider environment, at least a first computing instance to execute the application for providing a service, wherein the first computing instance is provisioned in response to a policy for the cluster, wherein the cluster has a plurality of second computing instances, wherein each second computing instance executes the application as part of the cluster;
        determining which of the plurality of second computing instances to configure so that the first computing instance and the plurality of second computing instances can execute the application as part of the cluster, said determining comprising, for particular second computing instances of the plurality of second computing instances:
            retrieving, from the particular second computing instance, a configuration file indicating a topology of the cluster and a role of the particular second computing instance within the topology of the cluster; and determining, based on the configuration file, whether the particular second computing instance needs to be modified to account for the first computing instance;

automatically reconfiguring the application to account for the first computing instance, by invoking a function via an event-driven computing service in order to execute one or more scripts specific to the application, wherein the reconfiguring includes applying a service configuration to a configuration file of the first computing instance and to the configuration files of the determined second computing instances of the cluster to include the first computing instance as executing the application as part of the cluster, wherein the service configuration is defined based on the cluster;

determining that the operational metrics of the cluster trigger a scaling workflow based on the policy;

instantiating the scaling workflow by terminating at least one of the first computing instance and the second computing instances according to the policy; and further executing the one or more scripts in order to update the topology of the cluster in each of the computing instances that were not terminated, wherein the one or more scripts remove the terminated at least one of the first computing instance and the second computing instances.

7. The system of claim 5, wherein applying the service configuration comprises:
obtaining the one or more scripts for configuring the cluster, wherein the one or more scripts include commands for adding metadata associated with the first computing instance to the service configuration.

8. The system of claim 7, wherein the one or more scripts further include commands for defining a role in the application for the first computing instance.

9. The system of claim 6, wherein the provisioning the first computing instance to execute the application comprises:
instantiating the first computing instance from a virtual machine image that includes the application; and
installing one or more services of the application on the first computing instance via a bootstrap process.

10. The system of claim 6, wherein the operation further comprises:
registering the first computing instance with a load balancer that routes network traffic directed to the cluster.

11. A non-transitory computer-readable storage medium storing instructions executable to perform an operation for scaling a cluster of servers executing an application in a service provider environment, the operation comprising:
receiving an indication that one or more metrics associated with the cluster in the service provider environment triggers a specified scaling condition specific to the application, wherein the cluster includes a plurality of application server instances executing one or more services provided by the application;
provisioning at least one additional application server instance in response to the indication;
installing the one or more services provided by the application on the additional application server instance;
obtaining one or more scripts specific to the application and for configuring the cluster, including the additional application server instance, to account for the additional application server instance so that the cluster can execute the one or more services;
determining which of the application server instances in the cluster, including the additional application server instance, to configure so that the cluster can execute the one or more services, said determining comprising, for particular application server instances of the plurality of application server instances:
retrieving, from the particular application server instance, a configuration file indicating a topology of the cluster and a role of the particular application server instance within the topology of the cluster; and
determining, based on the configuration file, whether the particular application server instance needs to be modified to account for the additional application server instance;
automatically reconfiguring the application to account for the additional application server instance, by operation of one or more computer processors when executing the instructions and by invoking a function via an event-driven computing service in order to execute the one or more scripts on the determined application server instances so that the cluster can provide the one or more services, wherein automatically reconfiguring the application comprises modifying the configuration files of the determined application server instances to include an updated topology that includes the additional application server instances;
determining that the one or more metrics trigger a scaling workflow based on a policy of the cluster;
instantiating the scaling workflow by terminating at least one of the application server instances according to the policy; and
further executing the one or more scripts in order to update the topology of the cluster in each of the application server instances that were not terminated, wherein the one or more scripts remove the terminated at least one of the application server instances.

12. The non-transitory computer-readable storage medium of claim 11, wherein the operation further comprises:
applying the updated topology that includes the additional application server instance to each of the plurality of application server instances and to the additional application server instance.

13. The non-transitory computer-readable storage medium of claim 11, wherein the one or more scripts includes commands for modifying the configuration file of individual application server instances, each configuration file including metadata associated with the application server instance.

14. The computer-readable storage medium of claim 11, wherein:
the application comprises a non-auto-scaling application, which is not configured to dynamically auto-scale itself based on a number of the application server instances;
the non-auto-scaling application is reconfigured by a configuration engine component of an auto-scaling server operatively connected to the cluster via a network;
the auto-scaling server is notified by a monitoring service of the specified scaling condition being triggered;
the auto-scaling server, the function, and the event-driven computing service are external to the non-auto-scaling application;

the function is configured to register the additional application server instance with a specified management server associated with the non-auto-scaling application; and the additional application server instance is provisioned by a deployment engine component of the auto-scaling server.

15. The computer-readable storage medium of claim 14, wherein:

the operation further comprises applying the updated topology that includes the additional application server instance to each of the plurality of application server instances and to the additional application server instance;

the one or more scripts include commands for modifying the configuration file of the particular application server instance;

the configuration file includes metadata associated with the particular application server instance; and the one or more metrics include metrics associated with the non-auto-scaling application.

16. The computer-readable storage medium of claim 15, wherein:

the at least one additional application server instance is provisioned based on a specified policy for the cluster;

the reconfiguring includes applying a service configuration to configuration files of the determined application server instances and to a configuration file of the at least one additional application server instance to include the at least one additional application server instance as executing the non-auto-scaling application as part of the cluster, wherein the service configuration is defined based on the cluster;

the one or more scripts further include commands for adding metadata associated with the additional application server instance to the service configuration and still further include commands for defining a role in the non-auto-scaling application for the at least one additional application server instance; and the one or more scripts are generated from specified application settings of the non-auto-scaling application, wherein the specified application settings include a network location for the configuration file for the non-auto-scaling application and further include a network address for the specified management server, the specified management server comprising a central management server configured to manage the service configuration of the cluster.

17. The computer-readable storage medium of claim 16, wherein:

provisioning the at least one additional application server instance comprises:

instantiating the at least one additional application server instance from a virtual machine image that includes the non-auto-scaling application; and installing one or more services of the non-auto-scaling application on the at least one additional application server instance via a bootstrap process; and the one or more scripts further include commands for updating the topology of the cluster in an application configuration file of the non-auto-scaling application and still further include commands for updating the topology of the cluster in the configuration file of each determined application server instance selected from a group including the plurality of application server instances and further including the at least one additional application server instance.

18. The computer-readable storage medium of claim 16, wherein:

the operation further comprises registering the at least one additional application server instance with a load balancer that routes network traffic directed to the cluster; and the non-auto-scaling application comprises a Voice-over-Internet-Protocol (VoIP) application, wherein the metrics include a number of concurrent voice calls, a number of active users, a number of user licenses, and a number of connected businesses.

19. The computer-readable storage medium of claim 18, wherein:

the specified scaling condition is registered with a metrics repository service;

the metrics repository service is configured to monitor the one or more metrics in the non-auto-scaling application via an agent;

the specified policy comprising a scaling policy for the cluster;

the specified scaling condition is specified in the scaling policy for the cluster;

the non-auto-scaling application comprises a third-party, closed-source, custom application;

the indication that the one or more metrics associated with the cluster triggers the specified scaling condition is received from the metrics repository service;

the specified scaling condition comprises a condition for initiating a scaling workflow for provisioning the at least one additional application server instance;

the indication specifies: a description of the specified scaling condition, whether to increase application server instances in the cluster, and the one or more metrics; and the metrics repository service includes a plurality of specified scaling conditions specific to the non-auto-scaling application, the plurality of specified scaling conditions including the specified scaling condition, each of the plurality of specified scaling conditions specifying, for a respective, distinct metric, of the metrics, that is associated with the respective specified scaling condition: (i) a respective, distinct, minimum threshold for the respective metric and (ii) a respective, distinct, minimum duration for which the respective metric is to at least meet the respective minimum threshold before the scaling workflow is initiated.

* * * * *

UNITED STATES PATENT AND TRADEMARK OFFICE
CERTIFICATE OF CORRECTION

| | | |
|---|---|---|
| PATENT NO. | : 11,038,986 B1 | |
| APPLICATION NO. | : 15/280562 | |
| DATED | : June 15, 2021 | |
| INVENTOR(S) | : Bradley Acar et al. | |

It is certified that error appears in the above-identified patent and that said Letters Patent is hereby corrected as shown below:

In the Claims

In Column 17, Line 30, in Claim 7, delete "claim 5," and insert -- claim 6, --.
In Column 18, Line 30, in Claim 11, delete "instances;" and insert -- instance; --.

Signed and Sealed this
Twenty-first Day of March, 2023

*Katherine Kelly Vidal*

Katherine Kelly Vidal
*Director of the United States Patent and Trademark Office*